(12) United States Patent
Toyoshima et al.

(10) Patent No.: US 11,585,426 B2
(45) Date of Patent: Feb. 21, 2023

(54) POWER TRANSMISSION DEVICE AND MANUFACTURING METHOD THEREFOR

(71) Applicants: JATCO Ltd, Fuji (JP); NISSAN MOTOR CO., LTD., Yokohama (JP)

(72) Inventors: Tahei Toyoshima, Atsugi (JP); Shingo Yamamoto, Fuji (JP); Kazuyuki Handa, Atsugi (JP); Masaki Shibuya, Fuji (JP); Tomohiro Nagata, Shizuoka (JP); Masakazu Tamura, Fuji (JP); Atsuyuki Ide, Fuji (JP); Yasuyuki Horie, Odawara (JP); Hideyuki Mamiya, Mishima (JP); Akira Kakimi, Hadano (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 296 days.

(21) Appl. No.: 16/646,035

(22) PCT Filed: Nov. 1, 2018

(86) PCT No.: PCT/JP2018/040677
§ 371 (c)(1),
(2) Date: Mar. 10, 2020

(87) PCT Pub. No.: WO2019/088220
PCT Pub. Date: May 9, 2019

(65) Prior Publication Data
US 2020/0263782 A1   Aug. 20, 2020

(30) Foreign Application Priority Data

Nov. 2, 2017 (JP) .............................. JP2017-213112
Dec. 13, 2017 (JP) .............................. JP2017-238201

(51) Int. Cl.
*F16H 57/04* (2010.01)
*F16H 57/02* (2012.01)

(52) U.S. Cl.
CPC ..... *F16H 57/0423* (2013.01); *F16H 57/0483* (2013.01); *F16H 57/043* (2013.01);
(Continued)

(58) Field of Classification Search
CPC ............. F16H 57/0423; F16H 57/0483; F16H 57/0424; F16H 57/043; F16H 57/0457; F16H 57/02043
See application file for complete search history.

(56) References Cited

U.S. PATENT DOCUMENTS 2,292,086 A * 8/1942 Pritchard ............ F16H 57/0423
184/11.1
4,414,861 A * 11/1983 Witt ..................... F16H 57/0427
184/6.12
(Continued)

FOREIGN PATENT DOCUMENTS

JP   2011-058519 A   3/2011
JP   2011-117467 A   6/2011
(Continued)

OTHER PUBLICATIONS

International Search Report (with English translation) and Written Opinion for PCT/JP2018/040677 dated Feb. 5, 2019.
(Continued)

*Primary Examiner* — Michael A Riegelman
(74) *Attorney, Agent, or Firm* — Foley & Lardner LLP

(57) ABSTRACT

A power transmission device includes: a gear; a case receiving the gear; and a baffle plate positioned between the gear and the case; the baffle plate including a guide portion arranged to guide an oil scooped up by the gear, into between the baffle plate and the case, and the guide portion
(Continued)

being disposed above an oil level within the case, the guide portion being adjacent to an axial side surface of the gear, the guide portion being positioned in the baffle plate on an upstream side in a rotation direction of the gear, and the guide portion including a first bent portion which is positioned on a tip end side, and which is bent in a direction from the case toward the gear.

13 Claims, 7 Drawing Sheets

(52) U.S. Cl.
CPC ...... *F16H 57/0424* (2013.01); *F16H 57/0457* (2013.01); *F16H 2057/02043* (2013.01)

(56) References Cited

U.S. PATENT DOCUMENTS

| | | | | |
|---|---|---|---|---|
| 8,393,248 | B2* | 3/2013 | Nagahama | F16H 57/0006 184/6.12 |
| 9,435,421 | B2* | 9/2016 | Mafune | F16H 57/0483 |
| 9,772,027 | B2* | 9/2017 | Preston | F16H 57/0457 |
| 10,208,848 | B2* | 2/2019 | Hotait | F16H 57/0463 |
| 10,837,541 | B2* | 11/2020 | Itou | F16H 57/0421 |
| 10,907,724 | B2* | 2/2021 | Akiyama | F16H 57/0457 |
| 11,149,838 | B2* | 10/2021 | Hagino | F01M 9/06 |
| 2006/0065487 | A1* | 3/2006 | Tominaga | F16H 57/05 184/6.12 |
| 2011/0126667 | A1* | 6/2011 | Nagahama | F16H 57/0006 74/606 R |
| 2018/0340604 | A1* | 11/2018 | Yageta | F16H 57/0471 |
| 2019/0085971 | A1* | 3/2019 | Itou | F16H 57/04 |
| 2020/0263781 | A1* | 8/2020 | Akiyama | F16H 57/0421 |
| 2020/0263782 | A1* | 8/2020 | Toyoshima | F16H 57/0483 |
| 2021/0293324 | A1* | 9/2021 | Goni | F16H 57/0423 |

FOREIGN PATENT DOCUMENTS

| | | |
|---|---|---|
| JP | 2012-102818 A | 5/2012 |
| JP | 2012-220004 A | 11/2012 |
| JP | 2018-076880 A | 5/2018 |
| WO | WO-2019/088220 A1 | 5/2019 |

OTHER PUBLICATIONS

Notice of Allowance on U.S. Appl. No. 16/644,896 dated Oct. 9, 2020.

U.S. Appl. Nol. 16/644,896, filed Mar. 5, 2020, JATCO Ltd, Nisson Motor Co Ltd.

Non-Final Office Action on U.S. Appl. No. 16/644,896 dated Jun. 29, 2020.

* cited by examiner

POWER TRANSMISSION DEVICE AND MANUFACTURING METHOD THEREFOR

TECHNICAL FIELD

This invention relates to a power transmission device.

BACKGROUND ART

A patent document 1 discloses a power transmission device arranged to transmit a power through two gears (lower gear and upper gear) which are engaged with each other.

In this power transmission device, a lower portion of the lower gear is submerged in the oil. When the lower gear is rotated, the oil is scooped up and scattered.

The scattered oil is splashed on the upper gear positioned above the lower gear, the scattered oil becomes a friction (stirring friction) with respect to the rotation of the upper gear.

Accordingly, the patent document 1 discloses a design of a shape of a plate (cover) for decreasing the stirring friction.

On the other hand, when the scooped-up oil falls to be scattered to the lower gear, the stirring friction of the lower gear may be increased.

Accordingly, it is desired that the stirring friction is not increased.

PRIOR ART DOCUMENT

Patent Document

Japanese Patent Document 2012-220004

SUMMARY OF THE INVENTION

In the present invention, a power transmission device comprises:
a gear;
a case receiving the gear; and
a baffle plate positioned between the gear and the case;
the baffle plate including a guide portion arranged to guide an oil scooped up by the gear, into between the baffle plate and the case, and
the guide portion being disposed above an oil level within the case.

By the present invention, it is possible to suppress the oil scooped up by the gear and falling, from entering into between the baffle plate and the gear, by the guide portion, and thereby to suppress the increase of the stirring resistance of the gear.

DESCRIPTION OF EMBODIMENTS

Hereinafter, one embodiment according to the present invention is explained in a case where a driving force transmission device is an automatic transmission for a vehicle.

Figure 1:
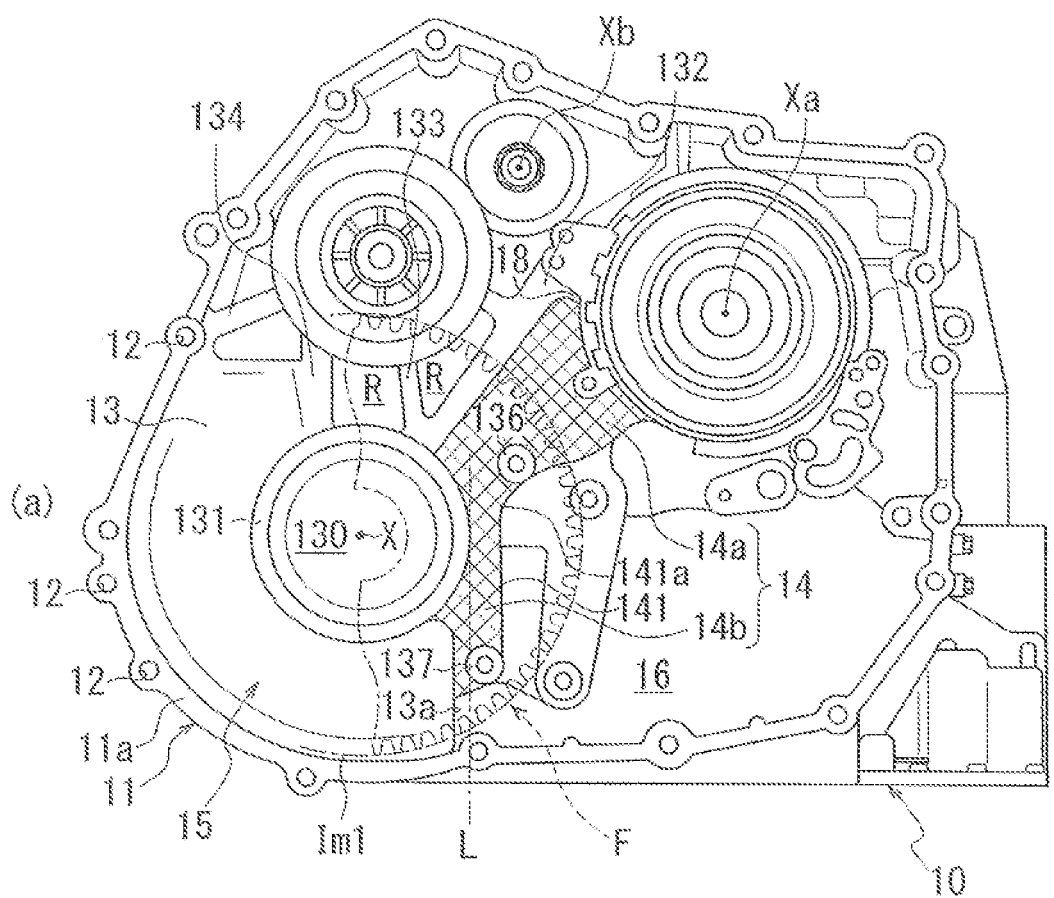
FIG. 1 are views for explaining a transmission case.
Figure 1:
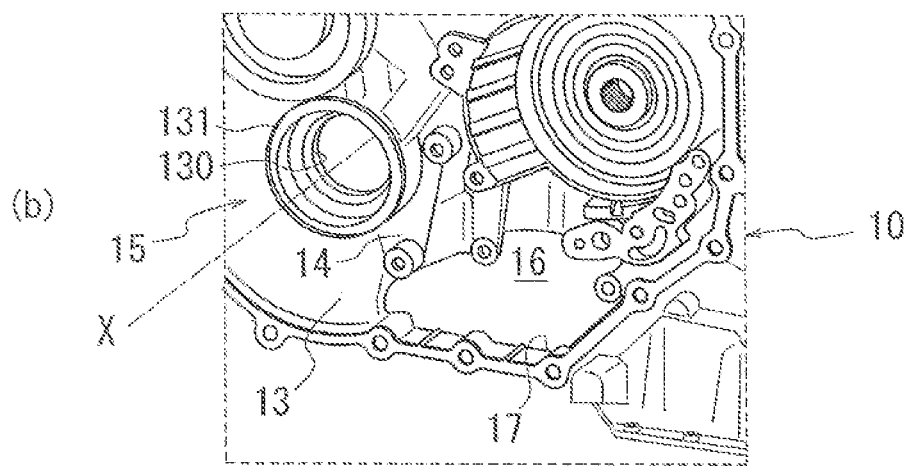

FIG. 1 are views for explaining a transmission case 10. FIG. 1(*a*) is a plan view showing the transmission case 10 when viewed from a torque converter (not shown) side. FIG. 1(*b*) is a perspective view of the transmission case 10 when viewed from an obliquely upper side, which is for explaining an opening portion 16 of the transmission case 10. Besides, in FIG. 1(*a*), a cross hatching is added to a region of a recessed portion 14 in a wall portion 13 of the transmission case 10 to visually differentiate the region of the recessed portion 14 from other regions.

Hereinafter, position relationships of constituting elements are explained with reference to a disposition of the transmission case 10 in FIG. 1(*a*).

In the following explanations, an "upper side" means an upper side with respect to the setting state of the automatic transmission. A "lower sides" means a lower side with respect to the setting state of the automatic transmission.

As shown in FIG. 1(*a*), a receiving portion 15 of a differential device is provided at a lower portion of the transmission case 10. This receiving portion 15 is opened to the torque converter (not shown) side (a front side of a paper).

A through hole 130 and a boss portion 131 are provided at a central portion of the receiving portion 15. The through hole 130 penetrates through the wall portion 13 in a thickness direction (a direction of an axis X). The boss portion 131 has a ring shape surrounding the through hole 130.

This boss portion 131 rotatably supports a differential case (not shown) including an outer circumference on which a final gear F is fixed.

A rotation driving force is transmitted from a shift mechanism section (not shown) to the final gear F. With this, the final gear F is arranged to rotate as a unit with the differential case (not shown) around the axis X.

The differential case (not shown) is connected to an axel shaft (not shown). A rotation driving force transmitted from the shift mechanism section (not shown) is transmitted through the axel shaft to driven wheels (not shown).

A circumferential wall portion 11 of the transmission case 10 includes a portion which is near the final gear F, and which has an arc shape surrounding an outer circumference of the final gear F when viewed from the direction of the axis X.

The circumferential wall portion 11 includes a plurality of bolt holes 12 provided at intervals in a circumferential direction. An end surface 11*a* of the circumferential wall portion 11 on the front side of the paper is a joint surface of a cover surrounding the torque converter (not shown).

The transmission case 10 is provided with a wall portion 13 which is positioned inside the circumferential wall portion 11, and which covers a side surface of the final gear F. The wall portion 13 is provided on the back side of the paper with respect to the final gear F, in a direction along the side surface of the final gear F.

The wall portion 13 is provided with ribs 132, 133, and 134 each of which extends from the outer circumference of the boss portion 131 in radial directions. Regions R among these ribs 132, 133, and 134 are small thickness portions in which thicknesses in the direction of the axis X is smaller than that of the wall portion 13.

The rib 132 extends from the outer circumference of the boss portion 131 toward a region between a rotation axis Xa of an input side and a rotation axis Xb of an output side of a shift mechanism section (not shown). In this embodiment, the rib 132 extends between the boss portion 131, and a circumferential wall portion 18 surrounding a forward and rearward switching mechanism (not shown).

The wall portion 13 includes a side edge portion 13a provided in a region below the boss portion 131 in the drawing. The side edge portion 13a is provided in a direction along a tangent line L of the outer circumference 131a of the boss portion 131 (in upward and downward directions in the drawing).

A region on a right side of the side edge portion 13a in the drawing is an opening portion 16 in which an oil pump (not shown) is installed. This opening portion 16 is formed with a depth on the back side of the paper. The oil pump (not shown) is provided on the back side of the paper with respect to the opening portion 16.

An opening 17 (cf. FIG. 1(b)) is provided at a lower portion of the transmission case 10. An oil pan (not shown) fixed at the lower portion of the transmission case 10 is connected through the opening portion 17 to the opening portion 16.

As shown in FIG. 1(a), the wall portion 13 of the transmission case 10 is provided with a recessed portion 14 which is recessed on the back side of the paper with respect to a surface of the wall portion 13, and which is provided on an opening portion 16 side (the right side in the drawing) when viewed from the boss portion 131.

This recessed portion 14 is provided in a region from the rib 132 to the side edge portion 13a of the wall portion 13 in the circumferential direction around the axis X, when viewed from the front side of the paper.

The recessed portion 14 includes an upper side region 14a which is on an upper side of the axis X in the drawing, and which extends along the rib 132 on a circumferential wall portion 18 side of a forward and rearward switching mechanism (not shown). Moreover, the recessed portion 14 includes a lower side region 14b which is continuous to the upper side region 14a on the lower side of the upper side region 14a, and which extends on the circumferential portion 11 side along the side edge portion 13a of the wall portion 13.

A side edge 141 of the recessed portion 14 on the opening portion 16 side includes a boundary portion 141a between the upper side region 14a and the lower side region 14b. The boundary portion 141a is positioned on an upper side of the axis X in the upward and downward directions of the drawing so as to ensure the width of the opening portion 16 in the upward and downward directions of the drawing.

Moreover, this boundary portion 141a is positioned on the axis X (the rotation axis) side of an imaginary circle Im1 along the outer circumference of the final gear F.

Accordingly, in the wall portion 13 of the transmission case 10, the opening portion 16 extends near the boss portion 131 inside the imaginary circle Im1.

With this, the width of the opening portion 16 in the leftward and rightward directions of the drawing is ensured. Moreover, a part of the region of the final gear F on the outer circumference side is disposed to be overlapped with the opening portion 16 when viewed from the direction of the axis X.

In this embodiment, the lower side region 14b of the recessed portion 14 is provided along the side edge portion 13a of the wall portion 13 to ensure the leftward and rightward width in which the support cylinder 137 is installed.

In the recessed portion 14, the rib 19 is provided in a region between the support cylinder 137 and the stepped portion 13a on the wall portion 13 side. Furthermore, the support cylinder 136 is provided in the recessed portion 14, in addition to the support cylinder 137.

The support cylinder 136 is provided for supporting the baffle plate 5 described later, similarly to the support cylinder 137.

These support cylinders 136 and 137 protrude on the front side of the paper from the region of the recessed portion 14 which is positioned inside the imaginary circle Im1. The support cylinders 135 and 137 are provided at an interval in the circumferential direction around the axis X.

Figure 2:
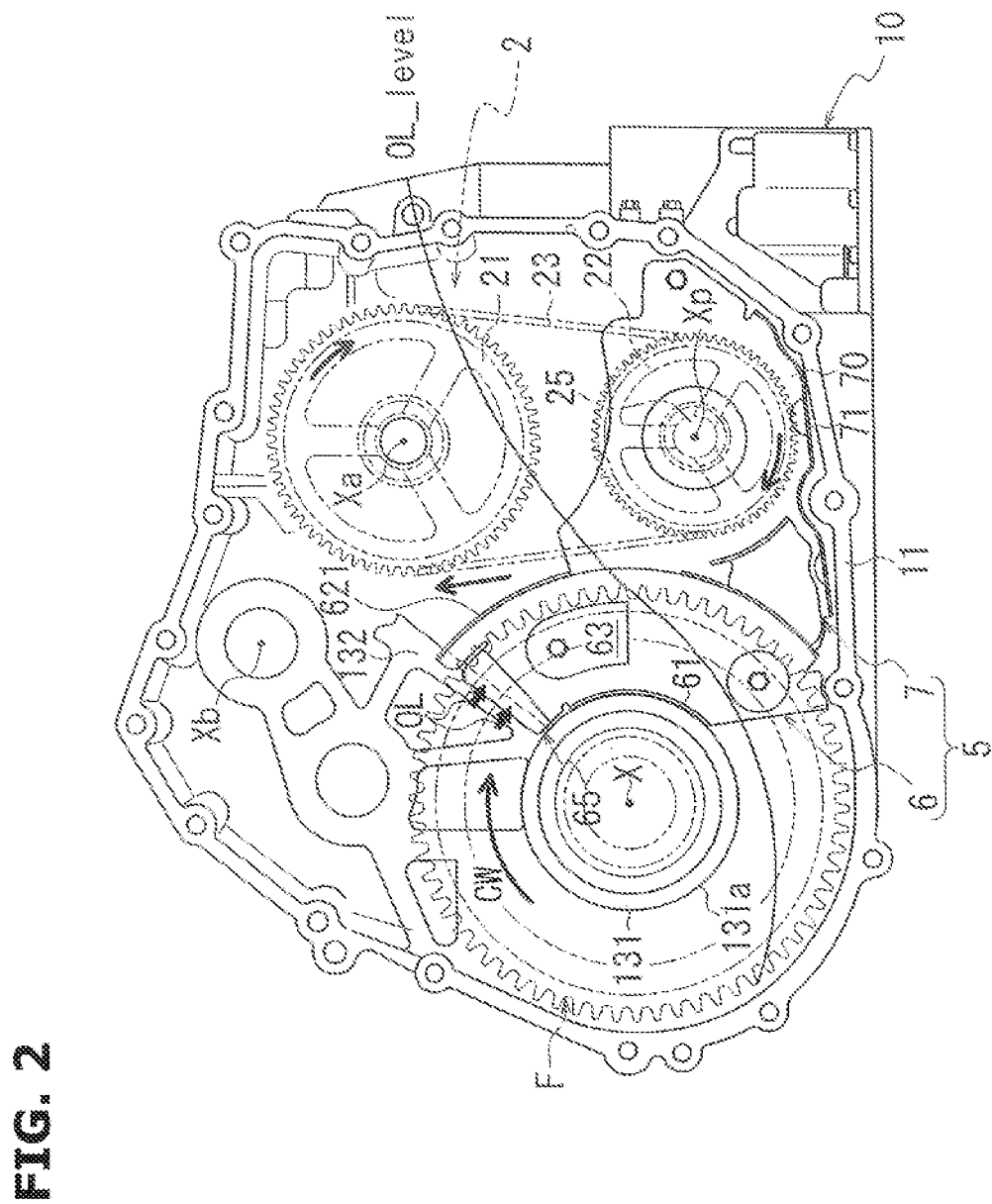
FIG. 2 is a view for explaining a disposition of a baffle plate in the transmission case.

FIG. 2 is a view for explaining a disposition of the baffle plate 5 in the transmission case 10. In FIG. 2, the inside of the circumferential wall portion 11 of the transmission case 10 is schematically shown for explaining position relationships among the baffle plate 5, the final gear F, and the driven sprocket 22

As described above, the oil pump (not shown) is installed in the opening portion 16 of the transmission case 10.

In this embodiment, the rotation driving force of the driving source is transmitted through a chain 23 of the rotation transmission mechanism 2 to the oil pump to drive the oil pump.

The rotation transmission mechanism 2 includes a driving sprocket 21 arranged to rotate as a unit with the input shaft; the driven sprocket 22 arranged to rotate as a unit with the output shaft 25 of the oil pump; and the chain 23 wound around the driving sprocket 21 and the driven sprocket 23.

In this embodiment, the driven sprocket 22 is arranged to rotate in a clockwise direction in the drawing at the forward traveling of the vehicle. The final gear F is arranged to rotate in the clockwise direction in the drawing at the forward traveling of the vehicle.

At the driving of the automatic transmission, the oil OL within the transmission case 10 is scooped (scraped) up by the rotating final gear F and the rotating driven sprocket 22.

For example, when the final gear F is rotated in the forward traveling direction, an oil level OL_level within the transmission case 10 (specifically, a space in which the final gear F and the driven sprocket 22 which are on the front side of the paper with respect to the baffle plate 5 (described later) is disposed) on the final gear F side is low, and an oil level OL_level within the transmission case 10 on the rotation transmission mechanism 2 side is high (cf. a line OL_level showing a height of the oil OL in FIG. 3).

As shown in FIG. 2, the rotation transmission mechanism 2 is positioned radially outside the final gear F.

Accordingly, in a case where the oil OL scooped up and scattered by the final gear F is acted to the driving sprocket 21 and the driven sprocket 22, this oil OL becomes a friction with respect to the rotations of the driving sprocket 21 and the driven sprocket 22.

Similarly, in a case where the oil scooped up and scattered by the driven sprocket 22 is acted to the final gear F, this oil becomes the friction with respect to the rotation of the final gear F.

Moreover, in a case where the oil OL scooped up and scattered by the final gear F is acted to the final gear F, this oil OL becomes the friction with respect to the rotation of the final gear F.

Accordingly, in the transmission case 10, the final gear F and the driven sprocket 22 are disposed so that positions in the direction of the axis X are deviated from each other.

Moreover, the baffle plate 5 is provided to prevent the scattering of the oil OL scooped up by the final gear F toward the rotation transmission mechanism 2 side, and to prevent the scattering of the oil OL scooped up by the driven sprocket 2 toward the final gear F side.

Figure 3:
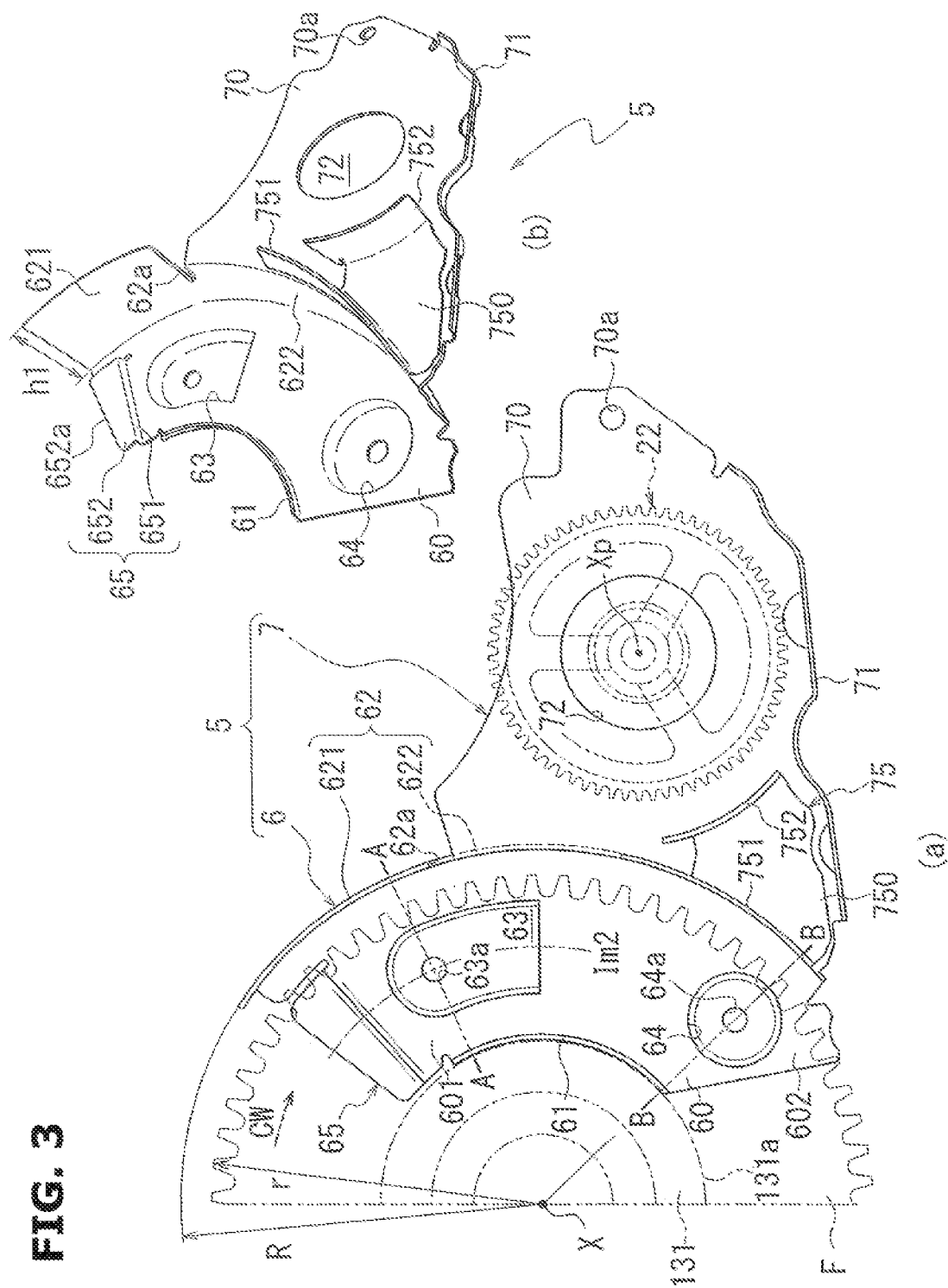
FIG. 3 are views for explaining the baffle plate.

FIG. 3 are views for explaining the baffle plate 5. FIG. 3(a) is a plan view of the baffle plate 5 when viewed in the direction of the axis X. FIG. 3(b) is a perspective view of the baffle plate 5.

Figure 4:
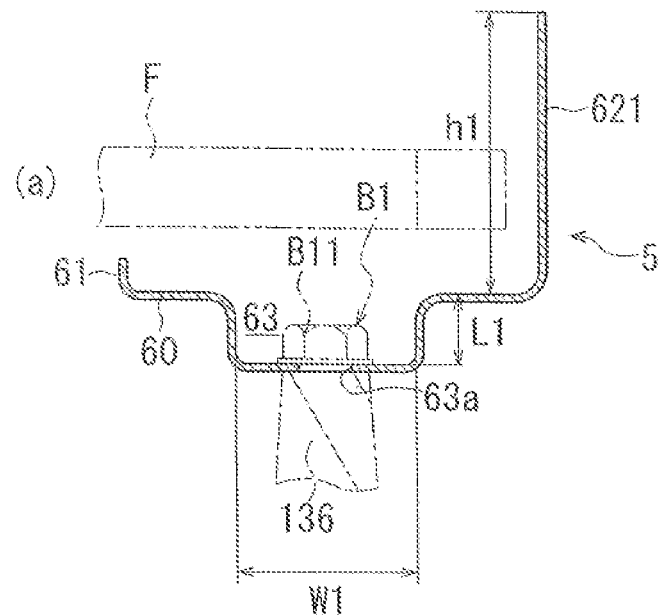
FIG. 4 are views for explaining the baffle plate.
Figure 4:
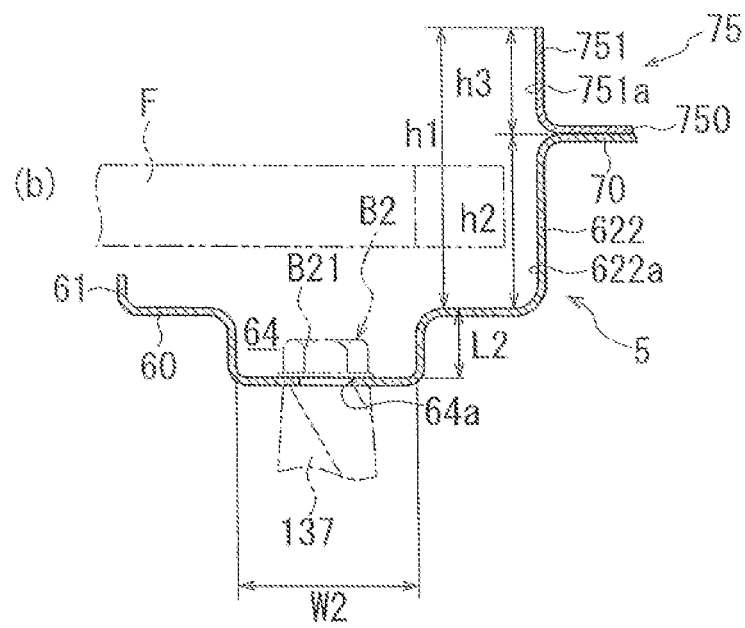

FIG. 4 are views for explaining the baffle plate 5. FIG. 4(a) is a view showing a section of the baffle plate 5 which is taken along an A-A line of FIG. 3(a). FIG. 4(b) is a view showing a section of the baffle plate 5 which is taken along a B-B line of FIG. 3(a).

The baffle plate 5 is provided to extend across a region of the transmission case 10 in which the final gear F is provided, and a region of the transmission case 10 in which the driven sprocket 22 is provided.

The baffle plate 5 includes a first cover portion 6 covering a side surface of the final gear F; and a second cover portion 7 covering a side surface of the driven sprocket 22.

The first cover portion 6 and the second cover portion 7 are positioned at different positions in the direction of the axis X. The second cover portion 7 is positioned on the front side of the paper with respect to the first cover portion 6.

The first cover portion 6 includes a base portion 60 which has a plate shape in a plan view.

The base portion 60 extends in the circumferential direction around the axis X along the outer circumference of the boss portion 131. The base portion 60 has an arc shape in the plan view.

The base portion 60 includes an inner wall portion 61 which is provided at an edge on the inner circumference side of the base portion 60, and which protrudes on the front side of the paper.

The inner wall portion 61 is formed by bending up the inner circumference side of the base portion 60 on the front side of the paper.

The inner wall portion 61 has an arc shape along the outer circumference 131a of the boss portion 131 in the plan view. The inner wall portion 61 is provided to have a substantially same protruding height along the entire length in the circumferential direction around the axis X.

In the transmission case 10, the baffle plate 5 is provided so that the inner wall portion 61 is abutted on the outer circumference 131a of the boss portion 131 (cf. FIG. 3). The baffle plate 5 is positioned in the radial direction of the axis X by the inner wall portion 61 abutted on the outer circumference 131a of the boss portion 131.

As shown in FIG. 3(a), a radius R of the base portion 60 to the outer circumference is set to be greater than a radius of the final gear F to the outer circumference.

In this embodiment, in a region of the transmission case 10 in which the first cover portion 6 of the baffle plate 5 is provided, the side surface of the final gear F on the wall portion 13 side is covered with the base portion 60 of the first cover portion 6.

The base portion 60 includes an outer wall portion 62 which is provided at an edge of the base portion 60 on the outer circumference side, and which protrudes on the front side of the paper.

This outer wall portion 62 is formed by bending up the outer circumference side of the base portion 60 on the front side of the paper.

The outer wall portion 62 includes a cutaway portion 62a which is provided at a middle position of the outer wall portion 62 in the circumferential direction around the axis X. The outer wall portion 62 is divided into two by the cutaway portion 62a.

When viewed in the direction of the axis X, an upper side region (a first outer wall portion 621) and a lower side region (a second outer wall portion 622) of the outer wall portion 62 with respect to the cutaway portion 62a have arc shapes along the outer circumference of the final gear F.

The first outer wall portion 621 is positioned on the upstream side of the second outer wall portion 622 in the rotation direction CW of the final gear F. As shown in FIGS. 4(a) and (b), the first outer wall portion 621 has a height h1 from the base portion 60. The height h1 of the first outer portion 621 is higher than a height h2 of the second wall portion 622 from the base portion.

The second outer wall portion 622 on the downstream side is bent in a direction apart from the base portion 60. The bent second outer wall portion 622 is connected to the base portion 70 of the second cover portion 7.

Accordingly, the baffle plate 5 is integrally formed by the first cover portion 6 and the second cover portion 7.

In this embodiment, the baffle plate 5 is made by press forming one metal plate, except for a separator 75 described later.

The plate-shaped base portion 70 of the second cover portion 7 extends in a direction apart from the first cover portion 6. The base portion 70 is provided substantially parallel to the base portion 60 of the first cover portion 6.

As shown in FIG. 1 and FIG. 2, the second cover portion 7 is provided in a direction to traverse the opening portion 16 in the leftward and rightward directions of the drawing along the circumferential wall portion 11 of the transmission case 10.

As shown in FIG. 3, the base portion 70 includes a bolt hole 70a which is formed at a position farthest from the first cover portion 6. The base portion 70 is fixed to the transmission case by a bolt passing through the bolt hole 70a.

As shown in FIG. 3(a), the base portion 70 includes a side wall portion 71 protruding on the front side of the paper. This side wall portion 71 is provided at a side edge of the base portion 70 along the circumferential wall portion 11 of the transmission case 10 (cf. FIG. 2).

The side wall portion 71 is formed by bending up the circumferential portion 11 side of the base portion 70 on the front side of the paper.

In the transmission case 10, the base portion 70 of the second cover portion 7 is provided to traverse the rotation axis Xp of the oil pump. The base portion 70 includes a through hole 70 formed in a region crossing the rotation axis Xp, and which penetrates through the base portion 70 in a thickness direction of the base portion 70.

A rotation shaft penetrating through this through hole 72 is connected to the driven rocket 22 on the front side of the paper with respect to the base portion 70, so as to rotate as a unit with the driven sprocket 22.

As shown in FIG. 4(a), the separator 75 is mounted on the base portion 70 at a position closer to the first cover portion 6 in the region on the side wall portion 71 side. The separator 75 is arranged to divide into the space on the final gear F side, and the space on the driven sprocket 22 side.

The separator 75 includes a wall portion 751 along the outer circumference of the final gear F; a wall portion 752 along the outer circumference of the driven sprocket 22; and a mounting portion 750 positioned between the wall portion 751 and the wall portion 752.

The wall portion 751 has an arc shape along the outer circumference of the final gear F when viewed in the direction of the axis X.

The wall portion 752 has an arc shape along the outer circumference of the driven sprocket 22 when viewed in the direction of the axis X.

As shown in FIG. 4(b), the separator 75 is provided at a position at which an outer side surface 751a of the wall portion 751 is substantially flush with the second outer wall portion 622 of the first cover portion 6, In this state, the mounting portion 750 is fixed to the base portion 70 of the second cover portion 7 by the welding and so on.

In this embodiment, a height h3 of the wall portion 751 of the separator 75 is set so that a height from the base portion 60 of the first cover portion 6 to the upper end of the wall portion 751 of the separator 75 is substantially identical to the height h1 of the first outer wall portion 621 of the first cover portion 6 from the base portion 60.

Moreover, in this embodiment, the height h1 is set so that the outer circumference of the final gear F is hidden in a range of the heights of the first outer wall portion 621 of the first cover portion 6, the second outer wall portion 622 of the first cover portion 6, and the wall portion 751 of the separator 75.

As shown in FIG. 3, the first cover portion 6 includes recessed portions 63 and 64 which are provided at substantially central portions of the base portion 60 in a widthwise direction, and which are recessed in the back side of the paper. These recessed portions 63 and 64 are provided at an interval in the rotation direction CW of the final gear F (in the clockwise direction of FIG. 3(a)).

These recessed portions 63 and 64 are provided to correspond, respectively, the support cylinders 136 and 137.

The recessed portion 64 is provided on the downstream side of the recessed portion 63 in the rotation direction CW of the final gear F.

The recessed portion 64 is formed by recessing the base portion 60 in a direction apart from the final gear F.

In a plan view, the recessed portion 64 has a circular shape surrounding the head portion 821 of the bolt 82 with a predetermined gap. A through hole 64a of the bolt 82 is formed at a central portion of the recessed portion 64.

The recessed portion 64 has a width W2 in a diameter direction, and a depth L2. The width W2 and the depth L2 are set so as to receive the head portion 821 of the bolt 82 (cf. FIG. 4(b)).

Figure 5:
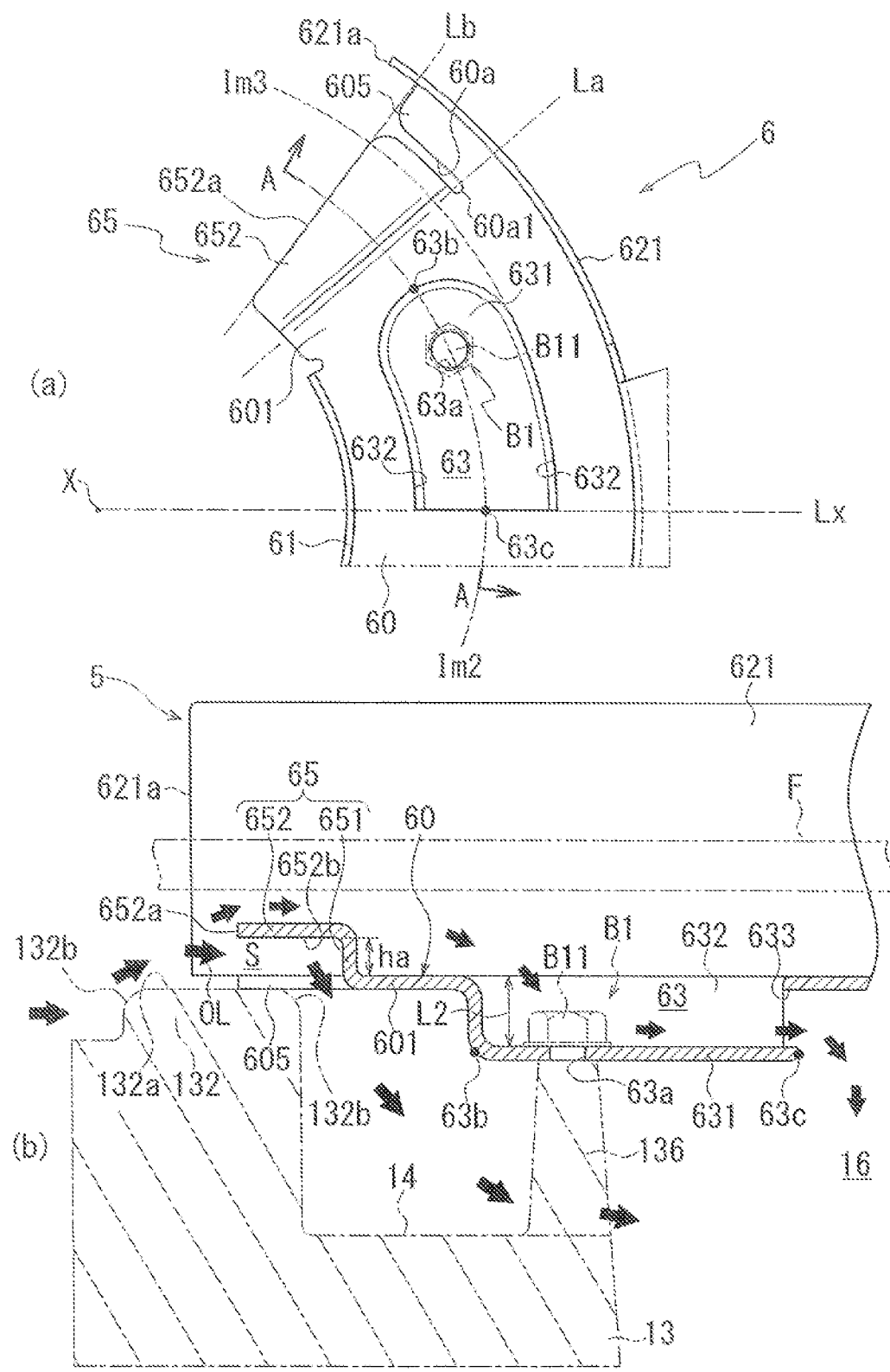
FIG. 5 are enlarged views showing a main part of the baffle plate.

FIG. 5 are an enlarged view showing a main part of the baffle plate 5. FIG. 5(a) is an enlarged view showing a portion around the recessed portion 63 provided to the first cover portion 6. FIG. 5(b) is a sectional view taken along an A-A line in FIG. 5(a).

In FIG. 5(b), imaginary lines represent a portion around the recessed portion 14, and the rib 13 provided to the wall portion 13 of the transmission case 10.

Figure 6:
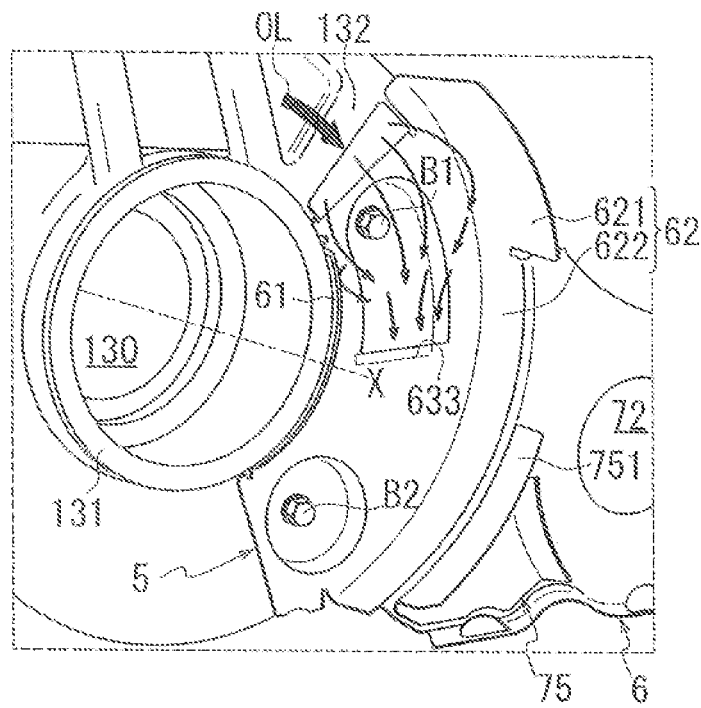
FIG. 6 is a view for explaining a disposition of the baffle plate in the transmission case.

FIG. 6 is a perspective view for explaining a disposition of the baffle plate 5 and a flow of the oil OL in the transmission case 10.

As shown in FIG. 3, the first cover portion 6 includes the recessed portion 63 provided on a first end portion 601 side of the base portion 60 in the longitudinal direction (in the circumferential direction around the axis X). The recessed portion 63 extends between the inner wall portion 61 and the first outer wall portion 621 toward a second end portion 602 side of the base portion 60 in the longitudinal direction.

The recessed portion 63 is provided along an imaginary circle Im2 passing through the center of the base portion 60 in the widthwise direction. The recessed portion 63 has a substantially arc shape in the plan view.

As shown in FIG. 5(b), the recessed portion 63 includes a bottom portion 631 which is substantially parallel to the base portion 60 and the first end portion 601 of the base portion 60; and a circumferential wall portion 632 surrounding an outer circumference of the bottom wall portion 631.

As shown in FIGS. 5(a) and (b), the recessed portion 63 includes a through hole 63a which is for the bolt B1, and which is provided at the first end portion 63b in the longitudinal direction. In the plan view, the first end portion 63b side of the recessed portion 63 has a semicircle shape surrounding the head portion B11 of the bolt B1 with a predetermined gap.

The recessed portion 63 has a width W1 and a depth L1. The width W1 and the depth L1 are set so as to receive the head portion B11 of the bolt B1 (cf. FIG. 4(a)).

Besides, in this embodiment, the width W1 and the depth L1 of the recessed portion 63 are identical to the width W2 and the depth L2 of the recessed portion 64.

As shown in FIG. 5(a), in the plan view, the second end portion 63c of the recessed portion 63 has a linear shape along a diameter line Lx of the imaginary circle Im2.

As shown in FIG. 5(b), in the circumferential wall portion 632 surrounding the bottom wall portion 631 of the recessed portion 63, a region overlapped with the diameter line Lx is removed, and an opening portion 633 (guide portion) is provided.

In the recessed portion 63, the opening portion 633 is opened at a most downstream position in the rotation direction CW of the final gear F.

In this case, the baffle plate 5 is provided to the transmission case 10 to satisfy the following conditions. (a) In the base portion 60 of the first cover portion 6, the region in which the recessed portion 63 is provided (the region of the base portion 60 on the first end portion 601 side) is positioned above the oil level of the oil OL (OL_level: cf. FIG. 2) within the transmission case at the rotation of the final gear F.

Accordingly, the positon of the opening portion 633 in the recessed portion 63 is the most downstream position in the rotation direction CW of the final gear F. The position of the opening portion 633 in the recessed portion 63 is above an upper plane (OL_level: cf. FIG. 2) of the oil OL within the transmission case (the space on the front side of the paper with respect to the baffle plate 5) at the rotation of the final gear F. That is, it is necessary that the opening portion 633 which is the guide portion is positioned at least above the height of the oil level during the forward traveling of the vehicle, although the oil level OL_level is varied in accordance with the traveling state of the vehicle. Besides, it is preferable that the opening portion 633 which is the guide portion is constantly positioned above the oil level regardless of the vehicle traveling state. Accordingly, for example, it is preferable that the opening portion 633 is disposed above the oil level at the vehicle stop at which the oil level has the maximum height.

As shown in FIG. 5(b), in the first cover portion 6, the region of the base portion 60 on the first end portion 601 side is adjacent to the side surface of the final gear F with a clearance in the direction of the axis X which is the rotation axis of the final gear F.

As described above, in this embodiment, the final gear F is rotated in the clockwise direction in the drawing (cf. FIG. 3). The region of the base portion 60 on the first end portion 601 side is positioned on the upstream side of the region of the base portion 60 on the second end portion 602 side in the rotation direction CW of the final gear F.

In this embodiment, the first end portion 601 of the base portion 60 includes a guide 65. This guide 65 is formed by bending a belt-shaped piece extending from the base portion 60, in a direction closer to the final gear F.

As shown in FIG. 5, the guide 65 is formed by bending an inner circumference side of a cutaway groove 60a provided to the base portion 60, on the front side of the paper (in the direction closer to the final gear F) along a diameter line La (the diameter line of the imaginary circle Im2) crossing the cutaway groove 60a.

In this case, the position of the diameter line La is set so that the diameter line La which is the reference for bending the guide 65 is positioned on the upstream side of the end edge 60a1 of the cutaway groove 60a in the rotation direction CW of the final gear F.

Accordingly, the end edge 60a1 of the cutaway groove 60a is positioned on the downstream side of the guide 65 in the rotation direction CW of the final gear F.

In the plan view, the cutaway groove 60a is provided radially outside an imaginary circle Im3 along an outer circumference side edge of the recessed portion 63. The cutaway groove 60a is formed into an arc shape along the imaginary circle Im3. In the plan view, the cutaway groove 60a is positioned between the guide 65 and the first outer wall portion 621. A region between the cutaway groove 60a and the first outer wall portion 621 is a mounting portion 605 mounted on the rib 132 of the transmission case 10 side.

As shown in FIG. 5(b), the tip end side of the guide 65 is further bent.

In this embodiment, the guide 65 includes a first guide 651 directing in a direction perpendicular to the base portion 60; and a second guide 652 extending from a tip end of this first guide 651.

The second guide 652 extends in a direction apart from the recessed portion 63 at a position apart from the base portion 60 by a predetermined height ha.

In this embodiment, the second guide 652 is substantially parallel to the base portion 60.

Accordingly, the second guide 652 is substantially parallel to the first end portion 601 of the base portion 60 and the bottom wall portion 631 of the recessed portion 63.

The second guide 652, the base portion 60 (the first end portion 601), and the bottom wall portion 631 are disposed in this order to be apart from the final gear F (cf. FIG. 5(b)).

Moreover, as shown in FIG. 5(a), a tip end edge 652a of the second guide 652 has a linear shape along a diameter line Lb of the imaginary circle Im2.

The tip end edge 652a of the guide 65 is positioned on the downstream side of the end portion 621a of the first outer wall portion 621 in the rotation direction CW of the final gear F.

Accordingly, the first outer wall portion 621 is positioned radially outside the guide 65. In this guide 65, the first outer wall portion 621 covers the portion radially outside the final gear F.

With this, it is possible to prevent the oil scooped (scraped) up by the final gear F from entering the drive sprocket 21 side.

In this embodiment, the portions of the recessed portions 63 and 64 are mounted on the support cylinders 136 and 137 (cf. FIG. 4 and FIG. 5). Then, the first cover portion 6 of the baffle plate 5 is fixed to the support cylinders 136 and 137 by the bolts B1 and B2 passing through the through holes 63a and 64a of the recessed portions 63 and 64.

In this state, the mounting portion 605 (the region radially outside the cutaway groove 60a) provided to the base portion 60 is mounted on the upper surface 132a of the rib 132. Moreover, the second guide 652 is disposed to confront the upper surface 132a with the clearance S between the second guide 652 and the upper surface 132a.

In the plan view, the tip end edge 652a of the second guide 652 extends to a substantially middle portion of a width of the rib 132 in the rotation direction of the final gear F.

Hereinafter, operations of the baffle plate 5 in this embodiment are explained.

As shown in FIG. 2, when the when the final gear F is rotated around the axis X, the oil OL within the transmission case 10 is scooped up.

The scooped-up oil OL is scattered in the upward direction within the transmission case 10. Moreover, the amount of the oil OL on the final gear F side is decreased. On the other hand, the amount of the oil OL on the rotation transmission mechanism 2 side is increased. With these, the oil level OL_level of the oil OL within the transmission case 10 is brought to the state shown in FIG. 2.

The scooped-up oil OL is moved in the circumferential direction around the axis X to be acted to the guide 65 of the baffle plate 5 from the upper side in FIG. 2 (cf. arrows in the drawing).

As described above, the second guide 652 of the guide 65 is provided with the clearance S between the second guide 652 and the upper surface 132a of the rib 132. In the oil reaching the guide 65, the oil OL flowing along the rib 132 enters from the clearance S into the inside (the recessed portion 14 side) of the first cover portion 6 of the baffle plate 5.

Then, the oil OL entering the inside (the recessed portion 14 side) of the first cover portion 6 is finally retrieved through the opening portion 16 and the opening portion 17 to the oil pan (not shown).

In this case, portions of the rib 132 on the upstream side and the downstream side in the rotation direction CW of the final gear F are applied with the R processing to direct the bent surfaces 132b toward the final gear F (cf. FIG. 5(b)).

In FIG. 5(b), a left side in the drawing is an upper side in the vertical direction. A right side in the drawing is a lower side in the vertical direction. Accordingly, the oil scooped up by the final gear F is moved from the left side to the right side in the drawing by the own weight.

Accordingly, in the oil OL impinged on the bent surface 132b (the bent surface 132b on the left side of the drawing) of the bent surface 132b and 132b of the rib 132 which is positioned on the upper side in the vertical direction, the movement direction of this oil OL is varied to a direction moving closer to the final gear F.

In this embodiment, a height ha of the second guide 652 from the base portion 60, and a position of the tip end edge 652a are set in accordance with results of experiments and simulations, for generating the following operations.

(a) Much of the oil Ol whose the movement direction is varied by the bent surface 132b is guided into the clearance S by impinging on the inner side surface 652b of the second guide 652.

With this, the more oil OL is guided into the clearance S. Accordingly, the oil OL guided into the clearance S impinges on the first guide 651 to discharge toward the region of the transmission case 10 in which the recessed portion 14 is provided.

Consequently, the amount of the oil OL flowing to the outside (the final gear F side) of the first cover 6 is decreased. With this, it is possible to suppress the amount of the oil OL acted to the final gear F positioned outside the first cover portion 6.

Therefore, it is possible to preferably prevent the oil scooped up by the final gear F from acting to the final gear F to be the friction to the rotation of the final gear F.

Moreover, the recessed portion 63 is opened on the outer side surface (the confronting surface confronting the final gear F) of the first cover portion 6. The recessed portion 63 includes the opening portion 633 positioned on the downstream side in the rotation direction CW of the final gear F.

The position of this opening portion 633 is on the downstream side in the movement direction of the oil OL flowing into the recessed portion 63. The recessed portion 63 is connected through the opening portion 633 to the space on the recessed portion 14 side.

Accordingly, in the oil OL entering the final gear F side of the first cover 6, the oil OL entering the recessed portion 63 is discharged through the opening portion 633 to the inside (the recessed portion 14 side) of the first cover portion 6.

With this, it is possible to discharge a part of the oil OL entering the final gear F side of the first cover portion 6, to the inside (the recessed portion 14 side) of the first cover portion 6. Accordingly, it is possible to further suppress the amount of the oil OL acted to the final gear F positioned outside the first cover portion 6.

As shown in FIG. 6, the first outer wall portion 621 is provided radially outside the guide 65.

This first outer wall portion 621 is arranged to vary the movement direction of the part of the oil OL entering the outside of the first cover portion 6, in a direction moving toward the recessed portion 63.

Accordingly, it is possible to guide the part of the oil OL entering the outside of the first cover portion 6, into the recessed portion 63 by the first outer wall portion 621, and to discharge this oil to the inside (the recessed portion 14 side) of the first cover portion 6. Besides, the inner wall portion 61 attains the same functions.

Accordingly, it is also possible to further suppress the amount of the oil DL acted to the final gear F positioned outside the first cover portion 6, by this first outer wall portion 621.

In this embodiment, the baffle plate 5 has the guide portion (the guide shape). With this, in the oil OL scooped up by the final gear F, it is possible to suppress the amount of the oil DL entering between the first cover portion 6 of the baffle plate 5, and the final gear F.

Hereinafter, configurations of the automatic transmission (the power transmission device) employing the baffle plate 5, and according to the embodiment are described with effects thereof.

(1) The automatic transmission includes the final gear F (gear), and the transmission case 10 receiving the final gear, and the baffle plate 5.

The first cover portion 6 of the baffle plate 5 is positioned in the transmission case 10 between the final gear F and the wall portion 13 (the recessed portion 14) of the transmission case 10 in the rotation axis direction (the axis X) of the final gear F.

The first cover portion 6 includes the guide portion (the opening portion 633 and the guide 65).

The oil OL scooped up by the final gear F is guided into between the first cover portion 6 of the baffle plate 5, and the wall portion 13 (the recessed portion 14) of the transmission case 10 by the guide portion (the opening portion 633 and the guide 65).

The guide portion (the opening portion 633 and the guide 65) is disposed above the oil level OL_level of the oil OL within the transmission case 10 (within the space on the front side of the paper with respect to the baffle plate 5). That is, it is necessary that the guide portion (the opening portion 633 and the guide 65) is positioned at least at a position higher than the oil level at the forward traveling of the vehicle, although the oil level OL_level is varied in accordance with the traveling state of the vehicle. Besides, it is preferable that the guide portion (the opening portion 633 and the guide 65) is constantly positioned at a position higher than the oil level, irrespective of the vehicle traveling state. Accordingly, it is preferable that the guide portion (the opening portion 633 and the guide 65) is disposed at a position higher than the height of the oil level during the vehicle stop during which the oil level is highest.

By this configuration, the guide portion (the opening portion 633 and the guide 65) can guide the oil OL which is scooped up by the final gear F, and which falls, into the inside of the first cover portion 6 (the recessed portion 14 side).

With this, in the oil OL scooped up by the final gear F, it is possible to suppress the amount of the oil OL from entering between the first cover portion 6 of the baffle plate 5 and the final gear F.

Accordingly, the amount of the oil OL acted to the final gear F is decreased. Consequently, it is possible to decrease the stirring resistance of the final gear F. That is, it is possible to suppress the increase of the stirring resistance of the final gear F.

In this case, a method of previously suppressing the entering oil OL, and a method of discharging the entered oil OL are conceivable as a method of decreasing the amount of the oil OL between the baffle plate 5 and the final gear F.

In a case where the latter is employed, the amount of the oil OL is increased once, and then discharged. Accordingly, in viewpoint of the decrease of the stirring resistance, it is preferable to previously suppressing the entering of the oil OL like the former. The opening portion 633 (the guide portion) is disposed above the oil level OL_level. With this, it is possible to previously suppress the entering of the oil OL.

(2) The first cover portion 6 of the baffle plate 5 includes the first end portion 601 (the upper end portion) positioned above the oil level OL_level of the oil OL within the transmission case 10.

The first end portion 601 is adjacent to (confronts) one of the side surfaces of the final gear F in the direction of the axis.

The first end portion 601 is positioned in the upstream direction (the upstream side) of the rotation direction CW of the final gear F with respect to the oil level OL_level within the transmission case 10.

The first end portion 601 includes, at least, the guide 65 (the first bent portion) bent in the direction from the transmission case 10 toward the final gear F, as the guide portion according to one aspect.

By this configuration, the falling oil OL scooped up by the final gear F impinges on the guide 65. With this, it is possible to discharge the oil OL to the inside (the recessed portion 14 side) of the first cover portion 6.

With this, in the oil OL scooped up by the final gear F, it is possible to suppress the amount of the oil OL entering between the first cover portion 6 of the baffle plate 5 and the final gear F.

With this, the amount of the oil OL acted to the final gear F is decreased, so that it is possible to decrease the stirring resistance of the final gear F. That is, it is possible to suppress the increase of the stirring resistance of the final gear F.

(3) The first cover portion 6 includes the plate-shaped base portion 60 disposed in a direction along the final gear F.

The guide 65 is formed by bending a belt-shaped piece extending from the first end portion 601 of the base portion 60, in a direction closer to the final gear F.

The guide 65 includes the first guide 651 extending in the direction which is apart from the base portion 60, and which is closer to the final gear F; and the second guide 652 formed by bending the tip end side of the first guide 651.

The second guide 652 extends from the tip end of the first guide 651 toward the upstream side in the rotation direction CW of the final gear F.

By this configuration, the second guide 652 is formed by bending the tip end side of the first guide 651 so that the second guide 652 extends upwards from the upper tip end (the upper end portion) of the first guide 651 in the vertical direction in the installation state of the automatic transmission.

With this, even when the oil OL impinged on the first guide 651 is moved closer to the final gear F, it is possible to preferably prevent the scattered oil OL from acting to the final gear F since the second guide 652 is positioned on the final gear F side of the first guide 651.

With this, it is possible to preferably prevent the oil OL scattered by impinging on the first guide 651 from entering between the first guide 651 of the baffle plate 5, and the final gear F.

Accordingly, it is possible to suppress the increase of the stirring resistance of the final gear F.

(4) The base portion 60 of the first cover portion 6 includes the outer wall portion 62 (the side surface wall portion on the outer circumference side) covering the radial side surface (the outer circumference surface) of the final gear F.

The outer wall portion 62 is formed by bending the outer circumference edge of the base portion 60 in the radial direction of the axis X which is the rotation axis of the final gear F.

The base portion 60 of the first cover portion 6 includes the cutaway groove 60a which is provided between the guide 65 and the outer wall portion 61, and which extends in the circumferential direction around the axis X.

The outer wall portion 62 can suppress the amount of the oil OL entering from the radially outside direction of the final gear F (for example, the rotation transmission mechanism 2 side) into between the first cover portion 6 of the baffle plate 5, and the final gear F.

(5) The end edge 60a1 (the tip end) of the cutaway groove 60a is positioned on the downstream side of the root (the bottom) of the first guide 651 of the guide 65 in the rotation direction CW of the final gear F.

The end edge 60a1 (the tip end) of the cutaway groove 60a is the end edge on the downstream side in the rotation direction CW of the final gear F.

In a case where the guide 65 is formed so that the bending of the guide 65 (the first guide 651) is started from the end edge 60a1 of the cutaway groove 60a, the stress concentration is generated at a portion (boundary portion with respect to the guide 65) at which the root of the first guide 651 and the end edge 60a1 of the cutaway groove 60a are abutted on each other.

In this case, the crack may be generated, for example, from the boundary portion due to the stress concentration. This effects on the durability of the baffle plate 5.

In the above configuration, the guide 65 is formed so that the bending of the guide 65 (the first guide 651) is started from a positon apart from the end edge 60a1 of the cutaway groove 60a. With this, it is possible to decrease the stress concentration relative to a case where the root of the first guide 651 and the end edge 60a1 of the cutaway groove 60a are directly abutted on each other.

(6) The first cover portion 6 of the baffle plate 5 includes the inner wall portion 61 formed by bending the inner circumference edge of the base portion 60 on the final gear F side.

The inner wall portion 61 confronts the side surface of the final gear F in the direction of the axis X which is the rotation axis of the final gear F (cf. FIG. 4).

The inner wall portion 61 is provided along the inner circumference edge of the base portion 60 which has the arc shape in the plan view.

The inner wall portion 61 is abutted on the outer circumference 131a of the support portion (the boss portion 131) of the final gear F.

The first cover portion 6 of the baffle plate 5 includes the guide 65. With this, the oil OL is guided and scattered to the region between the recessed portion 14 of the transmission case 10 side, and the first cover portion 6 (cf. FIG. 5).

The inner wall portion 61 having the predetermined height in the direction of the axis X is provided on the inner circumference edge of the base portion 60. With this, it is possible to preferably prevent the oil OL guided to the recessed portion 14 side, from leaking through the clearance between the base portion 60 and the boss portion 131, to the final gear F side of the first cover portion 6.

With this, it is possible to suppress the amount of the oil OL entering from the side (the inner circumference side) of the axis X which is the rotation axis of the final gear F, into between the first cover portion 6 of the baffle plate 5 and the final gear F.

Accordingly, it is possible to suppress the increase of the stirring resistance of the final gear F.

(7) The first cover portion 6 of the baffle plate 5 includes the recessed portions 63 and 64 which are recessed toward the wall portion 13 side (in a direction apart from the final gear F in the direction of the axis X) of the transmission case 10.

The bottom wall portion 631 of the recessed portion 63 includes the screw hole (the through hole 63a) for fixing the baffle plate 5 to the transmission case 10.

The baffle plate 5 is fixed to the transmission case 10 side by the bolts B1 and B2 penetrating through the through holes 63a and 64a.

The baffle plate 5 includes the bottom wall portion 631 (first surface) of the recessed portion 63 for forming the screw holes; the base portion 60 (second surface) which is a main surface of the baffle plate 5; and the second guide 652 (third surface) of the guide 65.

In a sectional view, in the baffle plate 5, the second guide 652 (third surface) is closer to the final gear F than the base portion 60 (second surface). The base portion 60 (second surface) is closer to the final gear F than the bottom wall portion 631 (first surface) of the recessed portion 63. The baffle plate 5 has three stepped shape.

By this configuration, the head portions B11 and B21 of the bolts B1 and 82 can be received within the recessed portions 63 and 64. With this, the baffle plate 5 can be fixed to the transmission case 1 side so that the head portions B11 and B21 do not protrude from the confronting surface of the base portion 60 which confronts the final gear F.

By appropriately setting the height ha of the second guide 652 (the third surface) from the base portion 60 (the second surface), it is possible to suppress the amount of the oil OL entering the final gear F side.

(8) The wall portion 13 of the transmission case 10 includes the rib 132 protruding in the direction closer to the baffle plate in the direction of the axis X.

In the sectional view, the rib 132 has a predetermined circumferential width in the circumferential direction around the axis X.

The R processing is applied to the both side edges of the rib 132 in the circumferential direction around the axis X. The rib 132 includes the curved surfaces 132 which are positioned at the both side edges of the rib 132, and which have the curved shape in the sectional view (cf. FIG. 5(*b*)).

The guide 65 is provided so that the tip end edge 652*a* side is overlapped with the rib 132 when viewed from the direction of the axis X.

The oil OL scooped up by the final gear F is acted to the curved surfaces 132*b* to which the R processing is applied, from the upper side in the vertical direction in the installation state of the automatic transmission.

In the R processing of the side edge portion, the shape (the curved surface 132*b*) which is apart from the wall portion 13 of the transmission case 10 from the upper side toward the lower side in the vertical direction is formed to the side edge portion of the rib 132.

Accordingly, when the oil OL scooped up by the final gear F falls, and the oil OL impinges on the rib 132 from the upper side in the vertical direction, the movement direction of the falling oil OL is varied from the direction perpendicular to the axis X, to the direction moving closer to the final gear F by the impinged curved surface 132*b* of the rib 132 (cf. FIG. 5(*b*)).

As described above, in a case where the tip end edge 652*a* side of the guide 65 is overlapped with the rib 132 when viewed in the direction of the axis X, the oil OL whose the movement direction is varied by the side edge portion of the rib 132 can impinge on the inner side surface 652*b* of the second guide 652 of the guide 65 so as to vary the movement direction of the oil OL to the direction apart from the final gear F.

With this, it is possible to discharge the oil OL whose the movement direction is varied by the guide 65, to the inside (the recessed portion 14 side) of the first cover 6, and to suppress the amount of the oil OL flowing into the final gear F side which is positioned outside the first cover 6.

That is, the oil OL is bounded on the tip end edge 652*a* side of the guide 65. With this, it is possible to suppress the amount of the oil OL flowing into the final gear F side.

With this, it is possible to suppress the increase of the stirring resistance of the final gear F.

Figure 8:
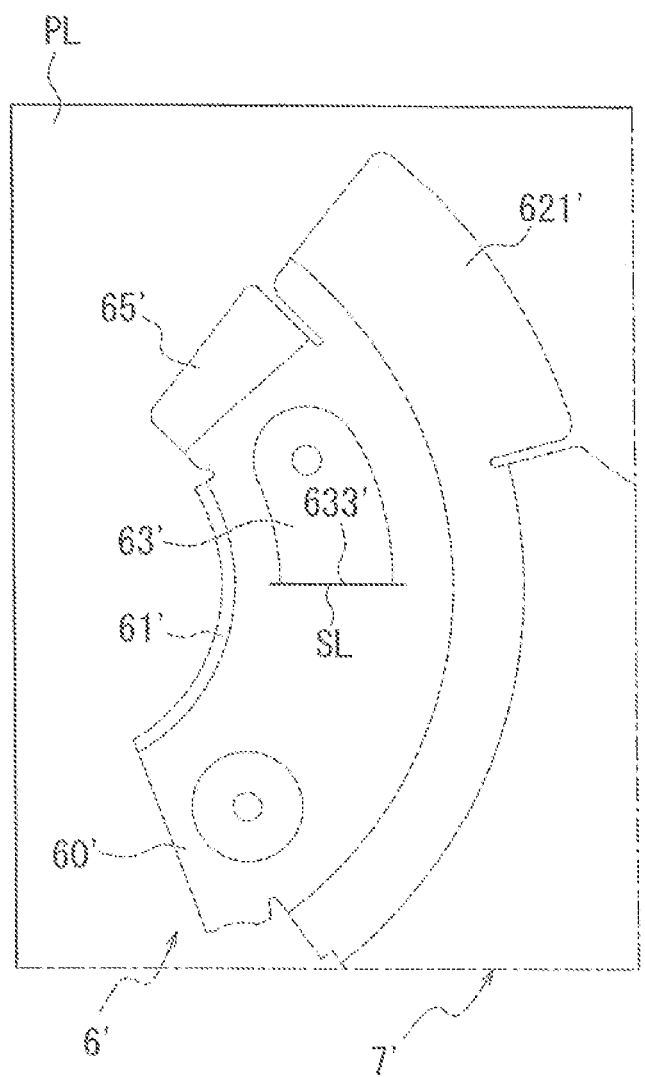
FIG. 8 is a view for explaining a manufacture of the baffle plate.

FIG. 8 is a view for explaining the manufacture of the baffle plate. FIG. 8 is a view for explaining a forming region in a case where the baffle plate 5 is manufactured by press-forming one metal plate PL.

The first cover portion 6 and the second cover portion 7 of the baffle plate 5 are manufactured by press-forming the one metal plate PL.

For example, in the first cover portion 6, when the metal plate PL is perforated along a broken line in the drawing, shapes of various portions of the first cover 6 are formed between a pair of dies.

For example, in the metal plate PL, regions 61', 621', and 65' which correspond to the inner wall portion 61, the first outer wall portion 621, and the guide 65 are bent and raised up at the press-perforation, so as to form in a direction perpendicular to the region 60' corresponding to the base portion 60.

In this case, a slit SL is formed in a region 633' corresponding to the opening portion 633 in a region 63' corresponding to the recessed portion 63. Then, the press forming is performed. With this, it is possible to readily form the opening portion 63 in the second end portion 63*c* of the recessed portion 63 in the manufactured baffle plate 5.

(9) The automatic transmission includes the final gear F (gear), and the transmission case 10, and the baffle plate 5.

The first cover portion 6 of the baffle plate 5 is positioned in the transmission case 10 between the final gear F and the wall portion 13 (the recessed portion 14) of the transmission case 10 in the rotation axis direction (the axis X) of the final gear F.

The first cover portion 6 of the baffle plate 5 includes the first end portion 601 (the upper end portion) positioned above the oil level of the oil OL within the transmission case 10.

The first cover portion 6 of the baffle plate 5 includes the recessed portion 63 recessed toward the wall portion 13 side of the transmission case 10 (in the direction apart from the final gear F in the direction of the axis X).

The recessed portion 63 has a predetermined length in the circumferential direction around the axis X.

The recessed portion 63 includes the opening portion 633 which is positioned at a most downstream position in the rotation direction CW of the final gear F, and which is positioned above the oil level (OL_level: cf. FIG. 2) of the oil OL within the transmission case, as the guide portion according to the one aspect.

The opening portion 633 connects the space within the recessed portion 63, and the inside space (the recessed portion 14 side) of the first cover 6.

By this configuration, it is possible to discharge the oil OL scattered and rotated with the final gear F rotating around the axis X, through the opening portion 633 to the inside (the recessed portion 14 side) of the first cover portion 6.

With this, it is possible to discharge a part of the oil OL entering the outside (the final gear F side) of the first cover 6 in the direction of the axis X, to the inside (the recessed portion 14 side) of the first cover portion 6 by the recessed portion 63 opened on the confronting surface of the first cover portion 5 which confronts the final gear F, and the opening portion 633 provided to the recessed portion 63.

With this, it is possible to further suppress the amount of the oil OL acted to the final gear F positioned outside the first cover portion 6.

Accordingly, it is possible to suppress the increase of the stirring resistance of the final gear F.

(10) The recessed portion 63 includes the screw hole (the through hole 63*a*) for fixing the first cover portion 6 of the baffle plate 5 to the transmission case 10.

The baffle plate 5 includes the recessed portion 63 including the screw hole (the through hole 63*a*). The recessed portion 63 and the through hole 63*a* are used when the first cover portion 6 is fixed to the transmission case 10 by the bolt.

By using this recessed portion 63, there is provided the opening portion 633 which is the discharge hole of the oil flowing into the recessed portion 63.

Accordingly, in a press process for forming the recessed portion 63, it is possible to form the opening portion 633 which is the discharge hole with the screw hole (the through hole 63*a*). Consequently, it is unnecessary to add another process for forming the opening portion 633 which is the discharge hole. Therefore, it is possible to form the opening portion 633 without increasing the manufacturing cost of the baffle plate 5.

(11) The first cover portion 6 of the baffle plate 5 includes the guide 65 provided on the upstream side of the recessed portion in the rotation direction CW of the final gear F.

The region of the recessed portion 63 formed by recessing the base portion 60 is connected only through the opening portion 633 to the recessed portion on the transmission case 10 side.

The opening portion 633 is formed in the recessed portion 63 at a most downstream positon in the rotation direction CW of the final gear F.

The recessed portion 63 is formed by recessing the base portion 60. The recessed portion 63 includes the bottom portion 631 constituting the recessed portion 63; and the circumferential wall portion 632 surrounding the bottom wall portion 631. The bottom wall portion 631 and the circumferential wall portion 632 are integrally formed with the base portion 60.

Accordingly, in the recessed portion 63, the region of the circumferential wall portion 632 that is other than the region in which the opening portion 633 is formed is closed. The recessed portion 63 is connected only through the opening portion 633 to the recessed portion 14 of the transmission case 10 side.

The opening portion 633 is positioned in the recessed portion 63 on the downstream side in the rotation direction CW of the final gear F. The upstream side is closed by the bottom wall portion 631 and the circumferential portion 632.

Accordingly, in the recessed portion 63 protruding from the base portion 60 toward the transmission case 10 side, a portion corresponding to the opening portion 633 is not provided on the first end side 63b side on which the guide 65 is provided.

Consequently, even when the oil OL discharged to the inside (the recessed portion 14 side) of the first cover portion 6 by the guide 65 is acted to the first end portion 63b side of the recessed portion 63, the oil OL does not flow into the recessed portion 63.

Therefore, it is possible to preferably prevent the oil OL discharged to the inside (the recessed portion 14 side) of the first cover portion 6, from flowing into the recessed portion 63, and acting to the final gear F positioned outside the first cover portion 6.

Besides, the present invention can be defined by the manufacturing method.

(12) The automatic transmission includes the final gear F (gear), and the transmission case 10, and the baffle plate 5.

The first cover portion 6 of the baffle plate 5 is positioned in the transmission case 10 between the final gear F and the wall portion 13 (the recessed portion 14) of the transmission case 10 in the rotation axis direction (the axis X) of the final gear F.

The first cover portion 6 of the baffle plate 5 includes the first end portion 601 (the upper end portion) positioned above the oil level of the oil OL within the transmission case 10.

The first cover portion 6 of the baffle plate 5 includes the recessed portion 63 recessed toward the wall portion 13 side of the transmission case 10 (in the direction apart from the final gear F in the direction of the axis X).

The recessed portion 63 has a predetermined length in the circumferential direction around the axis X.

The recessed portion 63 includes the opening portion 633 which is positioned at a most downstream position in the rotation direction CW of the final gear F, and which is positioned above the oil level (OL_level: cf. FIG. 2) of the oil OL within the transmission case, as the guide portion according to the one aspect.

The opening portion 633 connects the space within the recessed portion 63, and the inside space (the recessed portion 14 side) of the first cover 6.

The baffle plate 5 of the automatic transmission 5 is manufactured by press forming the metal plate PL (material plate).

As shown in FIG. 8, in the baffle plate 5, the slit (slit SL) is formed in a region corresponding to the opening portion 633 (the discharge hole) of the region 63' corresponding to the recessed portion in the metal plate PL. Then, the press forming of the metal plate PL is performed to simultaneously form the recessed portion 63 and the opening portion 633.

The automatic transmission is manufactured by assembling the thus-formed baffle plate 5 to the transmission case 10.

By this configuration, it is possible to readily form the recessed portion 63 including the opening portion 633.

Figure 7:
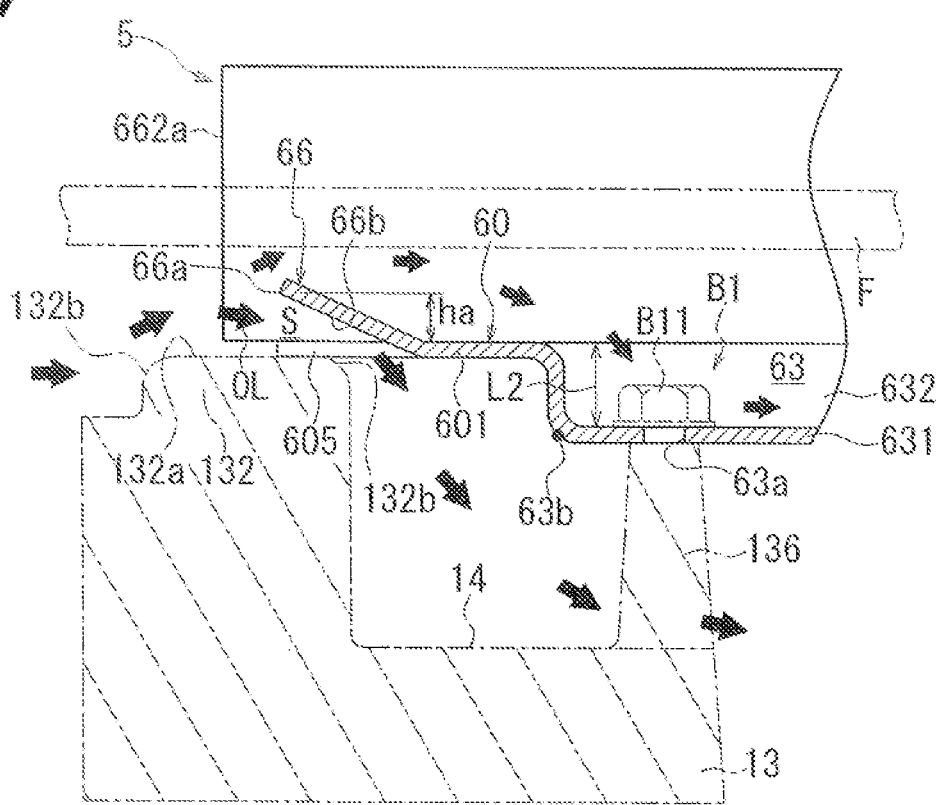
FIG. 7 is a view for explaining a guide portion of the baffle plate according to a variation.

FIG. 7 is a view for explaining the guide portion 66 of the baffle plate according to a variation.

In the above-described embodiment, the guide 65 is formed by bending the belt-shaped piece twice (cf. FIG. 5(*a*)). The guide portion is not limited to the aspect of the above-described embodiment. The guide portion may be formed by bending twice or more.

Moreover, the belt-shaped piece is bent from the boundary portion with respect to the first end portion 601 of the base portion 60. With this, the guide portion 66 may be inclined to be closer to the final gear F as it is apart from the first end portion 601 (the recessed portion 63).

The guide portion 66 of the baffle plate according to the variation extends from the first end portion 601 of the base portion 60 in a direction apart from the recessed portion 63.

As shown in FIG. 7, the tip end edge 66a of the guide portion 66 is positioned on the final gear F side of the base portion 60 of the first cover portion 6 in the direction of the axis X which is the rotation axis of the final gear F.

In the guide portion 66, a crossing angle of the guide portion 66 with respect to the base portion 60 is set so that the tip end edge 66a of the guide portion 66 is disposed at a position apart from the base portion 60 by the predetermined height ha.

Accordingly, much of the oil OL whose the movement direction is varied by the curved surface 132b of the rib 132 can impinge on the inner side surface 66b of the guide portion 66, so as to be introduced into the clearance S.

The inner side surface 66b of the guide portion 66 is inclined at a predetermined angle with respect to the base portion 60. With this, the clearance S between the guide portion 66 and the rib 132 becomes narrower it is closer to the base portion 60.

Therefore, it is possible to guide the oil OL to the recessed portion 14 (the upper side region 14a) side without interference with the movement of the oil entering into the clearance S.

The baffle plate 5 according to the variation has the following configuration.

(13) The tip end edge 66a of the guide portion 66 is inclined in a direction closer to the final gear F as it is apart from the recessed portion 63 of the base portion 60.

By this configuration, the oil OL falling by being scooped up by the final gear F can impinge on the guide portion 66, so that it is possible to discharge the oil OL to the inside (the recessed portion 14 side) of the first cover portion 6.

With this, in the oil OL scooped up by the final gear F, it is possible to suppress the amount of the oil OL entering between the first cover portion 6 of the baffle plate 5, and the final gear F.

With this, the amount of the oil OL acted to the final gear F is decreased, so that it is possible to decrease the stirring resistance of the final gear F. That is, it is possible to suppress the increase of the stirring resistance of the final gear F.

In case of the above-described guide 65, it is difficult to form the baffle plate 5 in a state where both the first guide 651 and the second guide 652 are abutted on the first outer wall portion 621 of the outer wall portion 62.

Similarly, it is difficult to integrally form the first outer wall portion 621 with both the first guide 651 and the second guide 652.

Accordingly, the clearance in the radial direction of the axis X is generated between the guide 65 and the first outer wall portion 621.

In FIG. 7, a left side in the drawing is the upper side in the vertical direction. A right side in the drawing is the lower side in the vertical direction. Accordingly, the oil OL scooped up by the final gear F is moved by own weight from the left side toward the right side in the drawing.

Consequently, in a case of employing the guide portion 66 inclined in a direction closer to the final gear F as it is apart from the recessed portion 63 of the base portion 60, the oil OL moved by the own weight can impinge on the inner side surface 66b of the guide portion 66.

With this, it is possible to vary the movement direction of the oil OL to the direction toward the inside (the recessed portion 14 side) of the first cover portion 6.

With this, it is possible to smoothly discharge the oil OL scooped up by the final gear F to the inside (the recessed portion 14 side) of the first cover portion 6, and thereby to suppress the amount of the oil OL flowing into the region between the baffle plate 5 and the final gear F.

Accordingly, it is possible to suppress the increase of the stirring resistance of the gear.

In the above-described embodiment, the guide 65 and the opening portion 633 provided to the first cover portion 6 of the baffle plate 5 are exemplified as the guide portion according to the invention.

That is, the guide portion including the guide paths of the two system (the guide 65 (the bending portion) and the opening portion 633 (the discharge hole)) is described. However, it is optional to employ only one of these.

In the above-described embodiment, the power transmission device is the automatic transmission for the vehicle. However, the power transmission device according to the present invention is not limited to the automatic transmission for the vehicle.

The present invention is applicable to a device which including a gear train including a plurality of gears, and in which at least one of the gears scoops up the oil within the receiving case of the gear train. This device is, for example, a speed reduction device arranged to decrease a speed of an input rotation, and to output the speed-reduced rotation.

Hereinabove, the embodiment according to the present invention is explained. However, the present invention is not limited to the aspect shown in the embodiment. The present invention can be arbitrarily varied as long as they are included in the technical thought of the present invention.

The invention claimed is:

1. A power transmission device comprising:
a gear;
a case receiving the gear; and
a baffle plate positioned between the gear and the case;
the baffle plate including a guide portion arranged to guide an oil scooped up by the gear, into between the baffle plate and the case, and
the guide portion being disposed above an oil level within the case,
wherein the guide portion is adjacent to an axial side surface of the gear;
the guide portion is positioned in the baffle plate on an upstream side in a rotation direction of the gear; and
the guide portion includes a first bent portion which is positioned on a tip end side, and which is bent in a direction from the case toward the gear.

2. The power transmission device as claimed in claim 1, wherein the guide portion includes a second bent portion bent upwards at a portion on the tip end side of the first bent portion.

3. The power transmission device as claimed in claim 2, wherein the baffle plate includes a side surface wall portion which is on an outer circumference side, and which is bent to cover a radial side surface of the gear; and
the baffle plate includes a groove extending in a circumferential direction between the first bent portion and the side surface wall portion on the outer circumference side.

4. The power transmission device as claimed in claim 3, wherein a tip end of the groove is positioned on the downstream side of the first bent portion in the rotation direction of the gear.

5. The power transmission device as claimed in claim 4, wherein the first bent portion is inclined in a direction toward an inner circumference of the gear.

6. The power transmission device as claimed in claim 5, wherein the baffle plate includes a side surface wall portion which is on the inner circumference side, which is positioned at an inner circumference side end portion of the baffle plate, and which is bent toward the axial side surface of the gear.

7. The power transmission device as claimed in claim 1, wherein the case includes a rib which has a curved shape in a sectional view, and which protrudes toward the baffle plate; and
the tip end of the guide portion of the baffle plate is disposed at a position to be overlapped with the rib when viewed in the axial direction of the gear.

8. The power transmission device as claimed in claim 1, wherein the baffle plate includes a recessed portion recessed toward a direction of the case; and
the recessed portion includes a screw hole arranged to fix the baffle plate to the case.

9. The power transmission device as claimed in claim 8, wherein a discharge hole is provided in the recessed portion at a most downstream position in the rotation direction of the gear, above an oil level of the case; and
the guide portion includes the discharge hole.

10. A manufacturing method of a power transmission device including a gear, a case receiving the gear, and a baffle plate positioned between the gear and the case, the baffle plate including a recessed portion which is recessed toward the case, and which includes a discharge hole positioned in the recessed portion at a most downstream position in a rotation direction of the gear, above an oil level within the case, and a screw hole which is formed in the recessed portion for fixing the baffle plate to the case, the manufacturing method comprising:

forming a slit at a most downstream position in the rotation direction of the gear, in a region of the baffle plate in which the recessed portion is formed, and pressing the baffle plate to simultaneously form the recessed portion and the discharge hole.

11. A power transmission device comprising:

a gear;

a case receiving the gear; and a baffle plate positioned between the gear and the case;

the baffle plate including a guide portion arranged to guide an oil scooped up by the gear, into between the baffle plate and the case, the guide portion being disposed above an oil level within the case, the baffle plate including a recessed portion which is recessed toward the case, and which includes a discharge hole positioned in the recessed portion at a most downstream position in a rotation direction of the gear, above an oil level within the case, and the guide portion including the discharge hole.

12. The power transmission device as claimed in claim 11, wherein the recessed portion includes a screw hole arranged to fix the baffle plate to the case.

13. The power transmission device as claimed in claim 11, wherein a portion of the side surface within the recessed portion which is other than a region of the discharge hole is closed.

\* \* \* \* \*